Oct. 6, 1942.　　　　C. L. ROBINSON　　　　2,298,168
DIFFERENTIAL PRESSURE MEASURING DEVICE
Filed May 3, 1940　　　4 Sheets-Sheet 1

Inventor:
Claude L. Robinson
By: Shee & Shee Attys

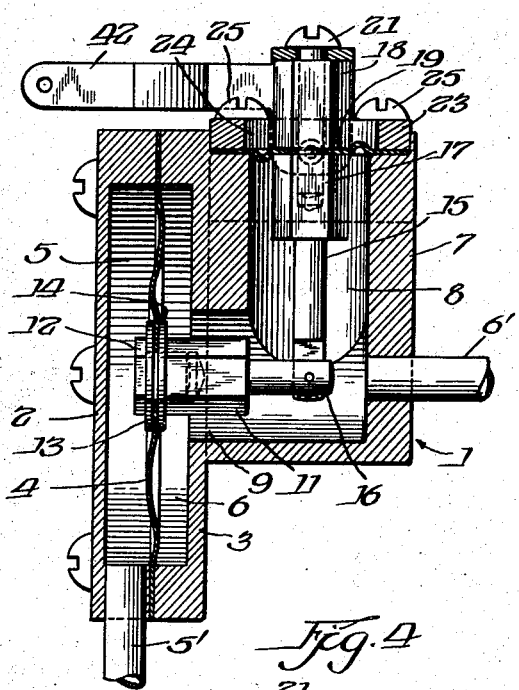
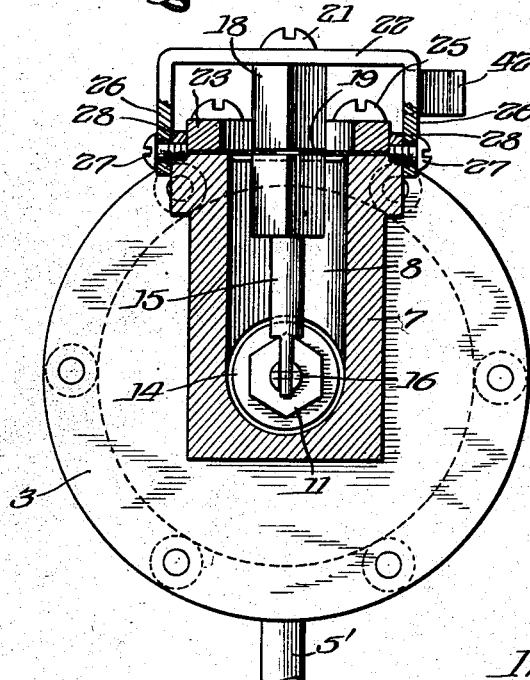

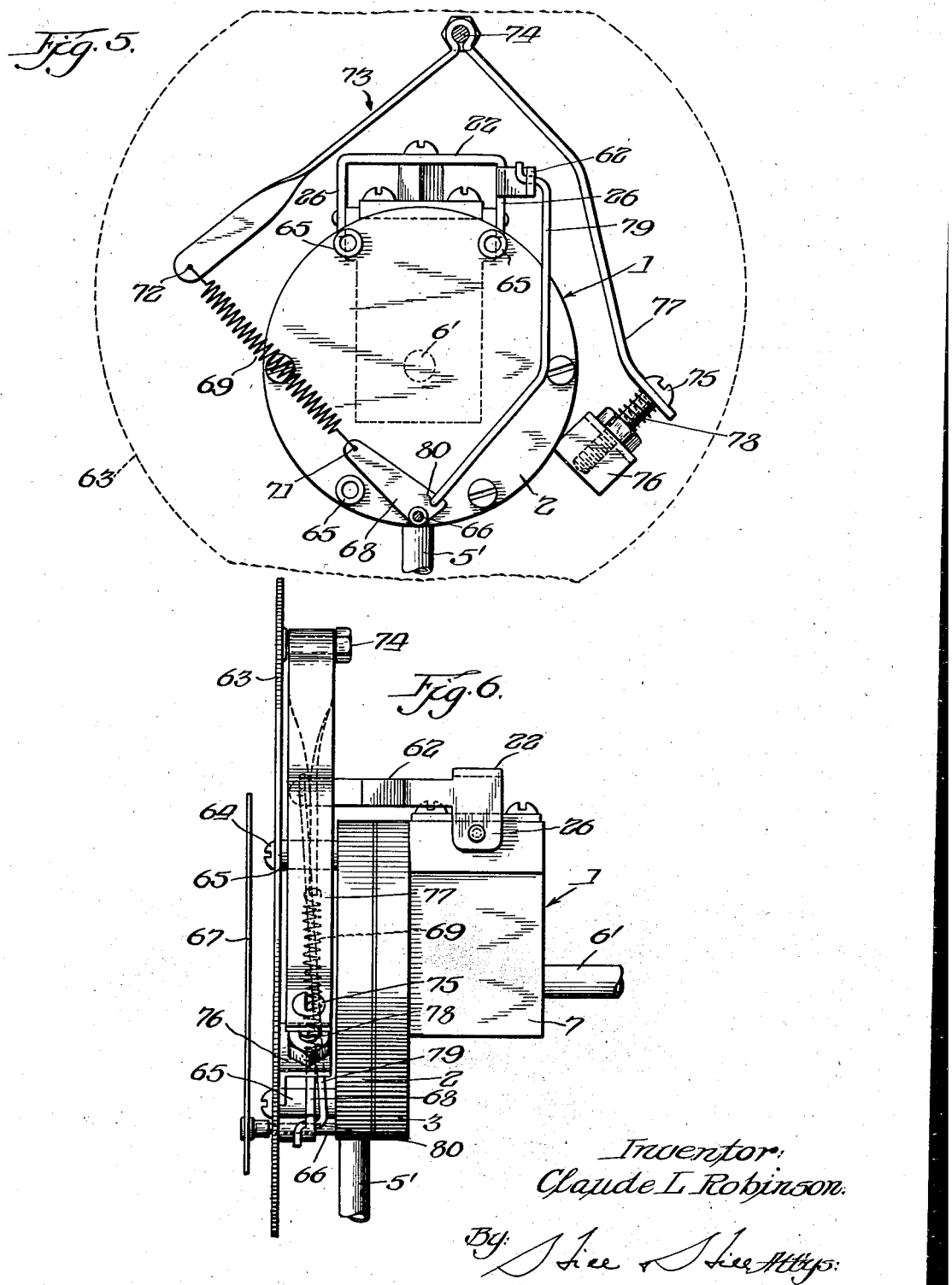

Oct. 6, 1942.   C. L. ROBINSON   2,298,168
DIFFERENTIAL PRESSURE MEASURING DEVICE
Filed May 3, 1940   4 Sheets-Sheet 4
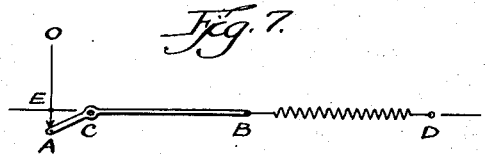
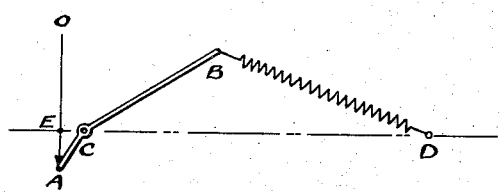
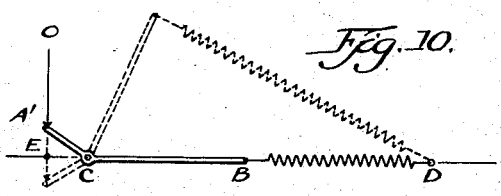
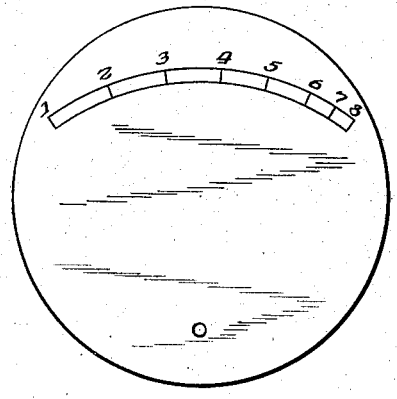
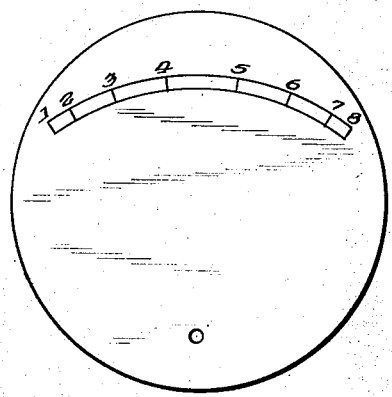
Inventor:
Claude L. Robinson
By Lee & Lee Attys.

Patented Oct. 6, 1942

2,298,168

UNITED STATES PATENT OFFICE 2,298,168

DIFFERENTIAL PRESSURE MEASURING DEVICE

Claude L. Robinson, Michigan City, Ind., assignor to Consolidated Instruments Corporation, Michigan City, Ind., a corporation of Indiana Application May 3, 1940, Serial No. 333,207

5 Claims. (Cl. 73—110)

The invention relates generally to indicating meters or the like, and more particularly to an improved device for indicating the difference in two fluid pressures.

The invention has among its objects the production of a pressure differential indicator which is relatively simple in construction, easily manufactured and very efficient in operation.

An important object of the invention is the production of an indicator which may be utilized under wide ranges of pressures, the instrument requiring only minor changes to accomplish the same, and having a single adjustment for calibrating the indicator to a predetermined dial scale, which adjustment will not affect the zero position of the device.

Another object of the invention is the production of an indicating movement of simple design and relatively few moving parts which may be readily constructed of greater sensitivity at one portion of the range of the device than at another, and by means of which the calibration may be controlled to provide larger scale graduations for a given unit at one point of the dial than at another point.

A further object of the invention is the production of a pressure differential actuating movement which requires no packing glands or the like, and which is unaffected by the relation of the pressures within the device to external pressures.

Many other objects and advantages of the invention herein shown and described will be obvious to those skilled in the art from the disclosure herein given.

To this end my invention consists in the novel construction, arrangement, and combination of parts herein shown and described and more particularly pointed out in the appended claims.

In the drawings, wherein like reference characters indicate like or corresponding parts:

Fig. 3 is a side elevational view of the actuating mechanism with the housing cut away to disclose the internal construction of the same;

Fig. 4 is an elevational view of the mechanism illustrated in Fig. 3 with the housing of the movement chamber cut away to disclose the internal construction;

Fig. 5 is a front elevational view of another form of indicating movement embodying the present invention with the dial removed;

Fig. 6 is a side elevational view of the indicator illustrated in Fig. 5;

Fig. 7 is a diagrammatic view, illustrating one form of dial movement construction with the parts in initial or zero position;

Fig. 8 is a diagrammatic view similar to Fig. 7 illustrating the movement in indicating position;

Fig. 9 is a plan view of a dial face designed for use with the movement of Figs. 7 and 8;

Fig. 10 is a diagrammatic view illustrating a modified movement construction; and Fig. 11 is a plan view of a dial face designed for use with the movement of Fig. 10.

The present invention is designed primarily for use in indicating pressure differentials in various types of measuring systems or the like, as for example, rate of flow indicating systems and marine speedometers, these merely being two of the numerous applications of the invention. In such systems, pressure differentials are generated by various means, such as the so-called up and down stream Pitot tube, various obstructions of the flow devices and others which are familiar to those skilled in the art.

Figure 1:
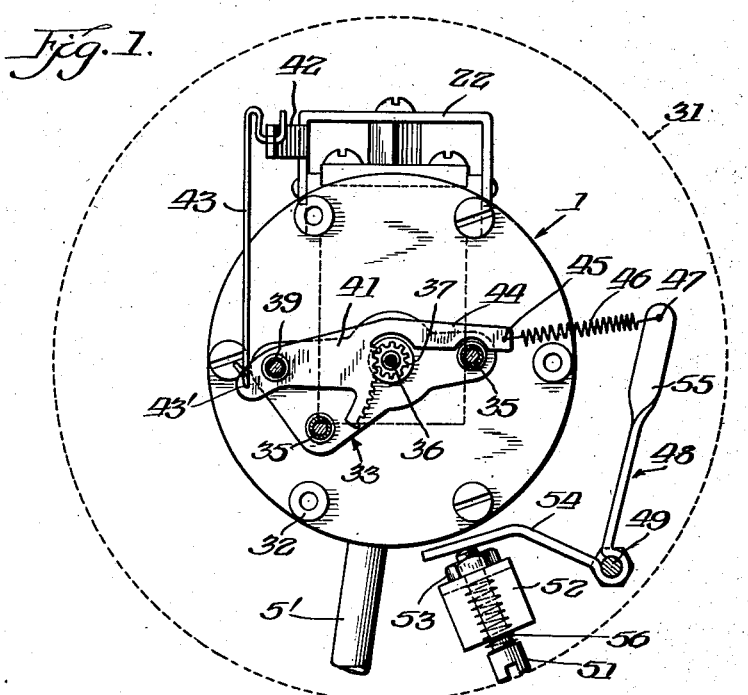
Fig. 1 is a front elevational view of one embodiment of the invention with the indicating dial and adjacent supporting plate removed.

In the construction illustrated in Fig. 1, I designates generally the actuating unit which translates the pressure differentials into mechanical movement for actuating the indicator needle or hand. As shown in detail in Figs. 3 and 4, the particular embodiment illustrated therein comprises a high pressure diaphragm chamber housing 2 which is secured by screws to a similarly shaped low pressure housing 3, forming a generally cylindrical chamber. Interposed between the two housings is a flexible diaphragm 4 of any suitable material which forms, in conjunction with the housing 2, a high pressure chamber 5 and similarly with the housing 3 forms a low pressure chamber 6. The housing 3 is provided with a hollow extension 7 forming a movement chamber 8, the latter being connected with the low pressure chamber 6 by a bore 9.

Secured to the center of the diaphragm 4 is a movement transmitting push rod 11, bolt 12 securely clamping the diaphragm between washers 13 and 14 to the arm 11, the opposite end of the rod 11 being pivotally secured to one end of a movement transmitting arm 15 by means of clevis 16 to pivotally connect the arms to one another. The upper end 17 of the arm 15 is secured to a block 18 which in effect is a continuation of the arm 15, the two being operative to clamp a sealing diaphragm 19 therebetween, a bolt 21 passing through the block 18 and threaded into end 17 of the arm 15 to securely hold the parts in operative relation. It will be apparent that this provides a very simple and efficient means of securing the sealing diaphragm 19 to the rod, the block 18 and arm 15 in the assembly acting as a single integral member. The bolt 21 also secures the block 18 to a yoke or saddle member 22. It might be mentioned that while I have shown the bolt 21 as fastening the block 18 to both the saddle member 22 and end 17 of the arm 15, obviously, if desired, other fastening means could be employed, as for example, the block 18 could be provided with a stud which could be threaded into the end of the arm 15 whereupon the bolt 21 would merely secure the block 18 to the saddle. The diaphragm 19, which seals the open end of the movement chamber 8, is clamped between the housing 7 and a rectangular plate 23, the latter being provided with an opening 24 for passage of the block 18, screws 25 securing the plate 23 and diaphragm 19 to the portion 7 of the housing. The legs 26 of the saddle member 22 are rotatably connected with the portion 7 of the housing by means of screws or pins 27 which pass through the legs 26 into the flanges 28 of the portion 7 of the housing. As the saddle 22, block 18, and arm 15 are securely fastened to each other, they will move as a unit, pivoting on the pins 27. It will be noted that as the axis of rotation of the saddle assembly falls in the plane of the sealing diaphragm 19, pressure differentials on opposite sides of the sealing diaphragm will be applied to the saddle assembly only as friction on pins 27. Thus movement of the diaphragm due to pressure differentials in the chambers 5 and 6 will be transmitted to the exterior of the mechanism minus only the frictional losses on the clevis 16 and pins 27. As there are no packing glands or the like, the usual pressure losses due to normal wear, etc., in the moving parts are completely eliminated.

Referring again to Figs. 1 and 2, the actuating unit 1 is secured to a dial plate 31 by studs 32 or the like, the studs 32 being secured to the respective members by any suitable means. Also secured to the dial plate 31 is a dial movement assembly, designated generally by the numeral 33, comprising a pair of plates 34 secured in spaced relation by columns or tubes 35, the plates 34 being secured thereto by any suitable means. Journalled in the plates 34 is a pinion shaft 36 having a pinion 37 rigidly secured thereto carried thereby, the end of the shaft 36 having an indicating needle or hand 38 secured thereto. Also journalled in the plates 34 is a shaft 39 carrying a quadrant arm 41, the latter being rotatable about the axis of the shaft 39, the teeth thereon engaging the pinion 37 whereby rotation of the arm 41 about its axis will cause rotation of the shaft 36 and indicating needle or hand 38. The actuating unit 1 is operatively connected to the quadrant arm 41 by means of a saddle arm 42 rigidly secured to the saddle member 22 and a wire coupling link 43 pivotally connected with the arm 42 and the quadrant arm 41. Thus, rotation of the saddle member 22 on its axis will cause the free end of the arm 42 to move downwardly or upwardly as the case may be, which movement is in turn transmitted to the quadrant arm 41, rotating the latter about its axis, which in turn will rotate the pinion 37 and shaft 36, carrying with it the indicating hand 38. Secured at 45 to an extension 44 of the quadrant arm 41 is a spring 46, the opposite end of which is secured at the point 47 to a substantially L-shaped adjustment arm 48 rotatable about a stud 49. Movement of the member 48 is restricted by an adjustment screw 51 carried by the dial plate 31 from an angle bracket 52, the latter having a nut 53 rigidly secured thereto, into which the stud 51 is threaded. The end of the stud 51 bears on the leg 54 of the member 48, rotation of the stud 51 rotating the member 48 about the stud 49, thereby moving the leg 55 of the member 48 to increase or decrease the tension and length of the spring 46. Any suitable means may be utilized to prevent undesired rotation of the adjusting stud 51, as for example, a compression spring 56 bearing at one end on the head of the stud 51 and at the other on the bracket 52.

It will be noted that the adjusting means does not affect the position of the indicating hand and adjusts the whole scale proportionately. This will be apparent from a reference to Fig. 1, showing the dial movement in zero position, where it will be noted that such position will not be altered by an increase or decrease in the length and tension of the spring 46, the end of the spring secured to the member 48 moving substantially tangentially with relation to the stud 49, and the ends of the spring remaining in line with the axis of the shaft 39.

Figure 2:
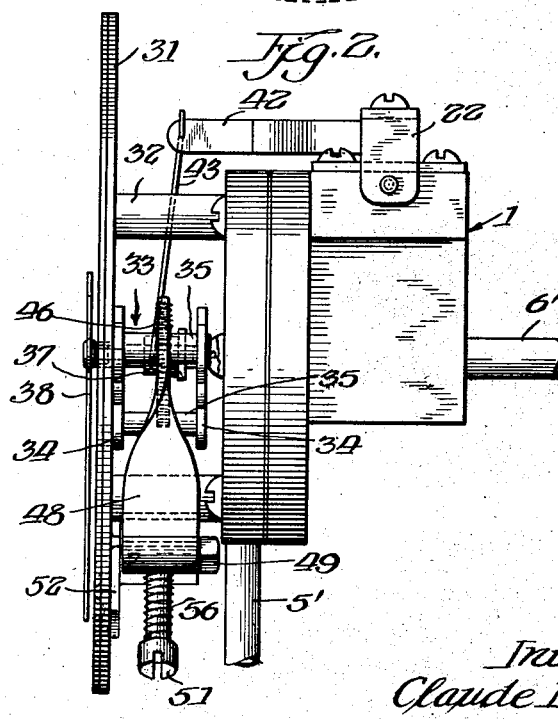
Fig. 2 is a side elevational view of the device illustrated in Fig. 1.

Operation of the complete device is as follows:

The actuating unit 1 is connected with the pressure differential generating means by tubing 5' and 6' communicating with the chambers 5 and 6, tubing 5' being connected to the high pressure side of the generating means and tubing 6 to the low pressure side. As the pressure in chamber 5 increases and that of chamber 6 decreases, the diaphragm 4 will be moved in the direction of the low pressure chamber, which movement will be transmitted as previously described through the arms 11 and 15 and block 18 to the saddle member 22, the arm 15, block 18, and saddle member 22 rotating as an integral unit about the axis of the pins 27. As the saddle member 22 rotates, in the case of an increased pressure to the left as shown in Figs. 2 and 3, the end of the saddle arm 42 will move downwardly, which motion is transmitted to the quadrant arm 41 by the link 43. Rotation of the quadrant arm will cause the teeth thereon to rotate the pinion 37, and shaft 36. Movement of the quadrant arm will be resisted by the tension spring 46 which will allow the quadrant arm to rotate until the applied pressures on the diaphragm are balanced by the action of the spring 46. Upon an increase in the pressure differential, the indicating hand will be moved until the mechanism has reached a point of equilibrium. Upon a change in pressures, the equilibrium will be destroyed and the diaphragm will move in response to the change in pressures until equilibrium is again restored. Obviously, by manipulation of the adjustment screw 51, the position of the indicating hand may be varied for a given differential. It will be noted, however, as previously mentioned, that such adjustment will not appreciably affect the initial or zero position of the indicating hand.

In the embodiment of the invention illustrated in Figs. 5 and 6, the same actuating unit 1 is employed. The saddle arm 62, however, is secured to the opposite leg 26 of the saddle member 22. The actuating unit 1 is secured to the dial plate 63 by means of screws 64 passing through sleeves 65, the latter spacing the dial plate 63 from the face of the housing 2 of the actuating unit. Journalled in the housing 2 and dial plate 63 is a shaft 66 having an indicating hand 67 rigidly carried on the free end thereof. Rigidly carried by the shaft 66 is an arm 68, at one end of which is connected a tension spring 69, as shown at 71. The opposite end of the spring 69 is secured at 72 to an L-shaped adjustment member 73 corresponding to the member 48 in the construction illustrated in Figs. 1 and 2, this member being pivotally carried by the dial plate 63 by means of a stud or the like 74. An adjusting screw 75 carried by an angle bracket 76, which is secured to the dial plate 63 by any suitable means, passes through the leg 77 to maintain the member 73 in the desired positon. Suitable means may be provided for preventing undesired rotation of the adjusting screw, as for example, compression spring 78, which encircles the bolt 75. The saddle arm 62 is connected at its free end with the arm 68, as shown at 80, by a link member 79 for transmitting movement from the saddle arm to the arm 68.

The operation of this embodiment of the invention is substantially the same as that of the device illustrated in Figs. 1 and 2. As in the previous construction, the pressure differential in the actuating unit 1 will cause movement of the saddle arm 62. The latter will cause a downward movement of the link member 79, which in turn will rotate the arm 68, shaft 66, and indicating hand 67. This rotation will continue until the applied force on the arm 68 is balanced by the action of the spring 69. The mechanism will remain in such position until the pressure differential changes, whereupon the arm 68 will rotate until equilibrium is again restored.

It will be apparent from an examination of Figs. 5 and 6 that this construction provides a very efficient device having a minimum of parts. Adjustment is accomplished merely by rotating the adjustment bolt 75 to increase or decrease the tension and length of the spring 69 as may be required to bring the instrument into proper calibration. It will be noted that, as in the construction of Figs. 1 and 2, altering the length and tension of the spring 69 will not appreciably affect the zero setting of the indicating hand as the points 71 and 72 and the axis of the shaft 66 lie in a straight line at zero position of the elements, as shown in Fig. 5. Likewise, as this line is substantially a tangent to the path of the point 72, the change in position of the latter point will have no appreciable effect on the arm 68.

The relationship of the points 43', 45, 47, and the axis of the shaft 39 of the construction illustrated in Figs. 1 and 2 and the points 71, 72, 80, and the axis of the shaft 66 in the construction shown in Figs. 5 and 6 are extremely important in determining the scale graduations, and sensitivity of the instruments at various points on the dials. By properly proportioning the relationship between these various points on the respective instruments, the sensitivity and scale graduations may be varied to meet individual requirements, that is, for corresponding units of scale graduation, the size of the graduations may be varied over different portions of the scale. If desired, the graduations at the middle of the scale for a given unit may be larger than graduations for the same unit at the ends of the scale, or, if desired, the larger graduations may be positioned at the beginning or the end of the scale, these results being achieved merely by changing the relationship of the above mentioned points. Likewise, the pressures applied to the diaphragm in certain cases may vary exponentially with relation to the units in which the scale is to be graduated, so that by varying the relationship of above points, the size of the graduations may be made uniform or even made greater at the low pressure end than unit graduations at the high pressure end of the scale. A typical example of such a case is a marine speed indicator, where the pressure differential is generated by an up and down stream Pitot tube or the like positioned in the water, in which case, the pressure would increase in proportion to the square of the relative water velocity.

As the function of the quadrant arm and pinion merely serve to provide greater travel of the needle over the dial, we can eliminate it from our diagram and take the simple case as illustrated by the construction in Fig. 5, wherein the indicating hand is rigidly connected with the lever arm 68, the quadrant arm 41 of Figs. 1 and 2 corresponding thereto. The arm AB in Fig. 7 represents the arm 68 or the quadrant arm 41, the arm being pivoted at C which corresponds to the axis of the shaft 39 in the construction of Fig. 1 or the shaft 66 of the construction of Fig. 5 and BD represents the spring 46 or spring 69. OA represents the force applied to the arm AB, A being the point at which the force is applied to the arm and corresponding to the points 43' and 80 of the respective constructions. The force OA for all practical purposes can be assumed to remain perpendicular to the line passing through the points C, B, and D, these points being in their initial position as shown in Fig. 7. With the arm AB in its initial position as shown and the force OA applied thereto, it will be apparent that the force OA is applied almost tangentially to the path of rotation of the point A and that as the arm AC is rotated downwardly, the turning movement or torque of the arm AC is equal to EC, the effective length of the arm, times OA, the force applied. As the arm moves downwardly, the mechanical advantage is reduced as the effective length EC of the arm AC becomes less and less, as shown in Fig. 8, this advantage approaching zero as the point E approaches coincidence with the point C, as indicated in dotted lines. It will, therefore, be apparent that as the arm AC rotates downwardly, the force OA, to cause a corresponding movement of the arm must be greater than that previously required for a movement of like amount. As the spring BD is in line with the arm CB, spring BD will offer little resistance to the initial rotation of the arm AB about the point C. However, as the arm AB rotates, the spring tension will balance the force OA. It will be noted that as the arm CB continues to rotate, the advantage of the lever CB and spring tension will increase as the force of the spring approaches a tangential line with respect to the path of the lever CB. Thus, it will be seen that in the construction illustrated in Figs. 7 and 8, the effect of the applied force on the actuating arm AB decreases while the effect of the spring tension increases. Thus if OA is increasing at a uniform rate, sensitivity will be greater and the unit dial graduations larger at the bottom of the dial than at the top, substantially as shown in Fig. 9.

However, it may be desirable to have the greater sensitivity and larger graduations at the middle of the dial rather than at the beginning. This is accomplished merely by positioning the point A above the line CBD, as shown at A' in Fig. 10. In this case, the mechanical advantage increases as the arm AC approaches the line ECD so that the sensitivity and the unit graduations would increase toward the middle of the dial, substantially as shown in Fig. 11, after which it would decrease as in the first case. It will be noted that such a construction is illustrated in Fig. 5 and Fig. 6, the point 80 being positioned above a line passing through the points 71, 72, and the axis of the shaft 66, while the former situation wherein A, C, and B, are in or below such a line, is substantially shown in Fig. 1. The characteristics of the spring also play an important part in determining the particular graduations as does the initial distance of the points B and D representing the initial length of the spring, as this will alter the mechanical advantage of the arm CB. In actual use, as for example, a marine speed indicator, the force OA will increase as the square of the relative water velocity which has made it difficult in the past to construct a meter in which the graduations and sensitivity were not relatively small at low speeds and large at high speeds. With the present invention, by proper selection of springs, and positioning of the points A, B, and C relative one another, the graduations of the scales may be varied to meet numerous requirements. Thus, it is possible with the present invention, if desired, to construct a speed indicator having graduations thereon for low speeds of the same size or even larger than graduations for the high speeds. This result is achieved with a relative simple construction in which the dial graduations may be varied with substantially minor changes in the parts. Likewise, the indicator may be readily adapted for different ranges of pressure merely by substituting springs of different sizes. It might be mentioned that as the adjustment of these instruments varies the initial spring length BD by movement of arms 48 Figs. 1 and 2, 73 Figs. 5 and 6, as well as the spring tension, the indicating hand will be affected proportionately for all graduations of the dial, and in effect, shifts the scale upon which the indicating hand moves to correspond and coincide with the predetermined scale printed upon the dial without requiring an additional adjustment of the zero setting.

It will be apparent from the above description that I have provided an indicating device which is very efficient in operation, relatively simple in construction and easily manufactured. Likewise, I have provided novel means whereby the instrument may be readily adapted by minor changes for widely divergent conditions both as to ranges and relative sensitivities of the instrument throughout the range covered.

It will also be noted that I have provided an actuating unit of simple construction in which leakage due to normal wear on the parts is completely eliminated, there being no stuffing box or the like.

Having thus described my invention it is obvious that various immaterial modifications may be made in the same without departing from the spirit and scope of the invention; hence, I do not wish to be understood as limiting myself to the exact form, construction, combination and arrangement of parts herein shown and described or uses mentioned.

What I claim as new and desire to secure by Letters Patent is:

1. In an actuating mechanism the combination of a housing having a pair of chambers, an actuating diaphragm separating said chambers, an arm positioned in one of said chambers, secured at one end to the diaphragm, a second arm pivotally connected to said first arm and extending transversely thereto, a sealing diaphragm for sealing said housing operatively connected to said second arm, a portion of the latter extending from the exterior side of the sealing diaphragm, a saddle member, having opposed legs, rigidly secured to the exterior end of said second arm, said legs being rotatably secured to the housing, the axis of rotation of said member lying substantially in the plane of said sealing diaphragm.

2. In an indicating device, the combination of a housing having a pair of chambers, an actuating diaphragm separating said chambers, an arm positioned in one of said chambers, secured at one end to the diaphragm, a second arm pivotally connected to said first arm and extending transversely thereto, a second diaphragm providing a seal for said housing and operatively connected to said second arm, a portion of the latter extending from the exterior side of the sealing diaphragm, a saddle having opposed legs, rigidly secured to the exterior end of said second arm, said legs being rotatably secured to the housing, the axis of rotation of said saddle lying substantially in the plane of said sealing diaphragm, an indicating dial secured to said housing, an indicating hand pivotally related to said dial, a member rigidly connected with said hand, a spring having one of its ends adjustably secured in relatively fixed relation with respect to the axis of said indicating hand, and the other end of said spring connected to said member, and means for operatively connecting said saddle and said member for transmitting saddle movement thereto.

3. In an indicating device, the combination of a housing having a pair of chambers, an actuating diaphragm separating said chambers, an arm positioned in one of said chambers, secured at one end to the diaphragm, a second arm pivotally connected to said first arm and extending transversely thereto, a second diaphragm providing a seal for said housing and operatively connected to said second arm, a portion of the latter extending from the exterior side of the sealing diaphragm, a saddle having opposed legs, rigidly secured to the exterior end of said second arm, said legs being rotatably secured to the housing, the axis of rotation of said saddle lying substantially in the plane of said sealing diaphragm, an indicating dial secured to said housing, an indicating hand pivotally related to said dial, a driving pinion for said hand, a quadrant member pivotally related to said dial, having teeth thereon engageable with said pinion for rotating the same, a spring having one of its ends adjustably secured in relatively fixed relation with respect to the axis of said quadrant member, and the other end of said spring connected to said quadrant member, and means for operatively connecting said saddle and said member for transmitting saddle movement thereto.

4. In an indicating device, the combination of a housing having a pair of chambers, an actuating diaphragm separating said chambers, an arm positioned in one of said chambers, secured at one end to the diaphragm, a second arm pivotally connected to said first arm and extending transversely thereto, a second diaphragm providing a seal for said housing and operatively connected to said second arm, a portion of the latter extending from the exterior side of the sealing diaphragm, a saddle having opposed legs, rigidly secured to the exterior end of said second arm, said legs being rotatably secured to the housing, the axis of rotation of said saddle lying substantially in the plane of said sealing diaphragm, an indicating dial secured to said housing, a member pivotally connected adjacent one end thereof to said dial, an indicating hand operatively connected to said member whereby movement of the latter is transmitted to said hand, a spring having one of its ends adjustably secured in relatively fixed relation with respect to the axis of said member and the other end of said spring connected to said member adjacent the opposite end thereof, and means operatively connecting said saddle and said member for transmitting saddle movement thereto.

5. In an indicating device, the combination of a housing having a pair of chambers, an actuating diaphragm separating said chambers, an arm positioned in one of said chambers, secured at one end to the diaphragm, a second arm pivotally connected to said first member and extending transversely thereto, a second diaphragm providing a seal for said housing and operatively connected to said second arm, a portion of the latter extending from the exterior side of the sealing diaphragm, a saddle having opposed legs, rigidly secured to the exterior end of said second arm, said legs being rotatably secured to the housing, the axis of rotation of said saddle lying substantially in the plane of said sealing diaphragm, an indicating dial secured to said housing, a member pivotally connected adjacent one end thereof to said dial, an indicating hand operatively connected to said member whereby movement of the latter is transmitted to said hand, a spring having one of its ends adjustably secured in relatively fixed relation with respect to the axis of said member and the other end of said spring connected to said member adjacent the opposite end thereof, the points of connection of said spring lying in their initial position in a straight line passing through the axis of said arm, and means for operatively connecting said saddle and said member for transmitting saddle movement thereto, said means being operatively connected with said member at a point transversely spaced from said line when said member is in its initial position.

CLAUDE L. ROBINSON.